United States Patent
Byrd (10) Patent No.: US 7,309,834 B1
(45) Date of Patent: Dec. 18, 2007

(54) EXTENDIBLE AND RETRACTABLE EXTENSION CORD APPARATUS

(76) Inventor: Danny L. Byrd, 2317 W. Dobbins Rd., Phoenix, AZ (US) 85041

( * ) Notice: Subject to any disclaimer, the term of this patent is extended or adjusted under 35 U.S.C. 154(b) by 482 days.

(21) Appl. No.: 11/027,055

(22) Filed: Dec. 30, 2004

Related U.S. Application Data (60) Provisional application No. 60/533,590, filed on Dec. 31, 2003.

(51) Int. Cl.
H01H 9/02 (2006.01)

(52) U.S. Cl. .................. 174/53; 174/57; 174/135; 174/66; 439/501; 242/389

(58) Field of Classification Search ............ 174/53, 174/57, 135, 48, 50, 66; 242/389, 397, 398; 439/501; 220/3.3, 3.7; 191/12.4
See application file for complete search history.

(56) References Cited

U.S. PATENT DOCUMENTS

| | | |
|---|---|---|
| 2,585,070 A | 2/1952 | Allard |
| 4,897,512 A | 1/1990 | Johnston |
| 5,494,446 A | 2/1996 | DeLucia et al. |
| 5,701,981 A | 12/1997 | Marshall et al. |
| 5,723,815 A | 3/1998 | Pena |
| 5,738,548 A | 4/1998 | Rutulante |
| 5,773,757 A * | 6/1998 | Kenney et al. ............ 174/53 |
| 6,184,461 B1 | 2/2001 | Flegel |
| 6,264,016 B1 | 7/2001 | Bales |
| 6,276,502 B1 | 8/2001 | Leyba et al. |
| 6,447,330 B1 | 9/2002 | Neiser |
| 6,619,981 B2 | 9/2003 | Neiser |
| 6,648,677 B1 | 11/2003 | Boyd |
| 2002/0123264 A1 | 9/2002 | Neiser |
| 2002/0151212 A1 | 10/2002 | Neiser |
| 2003/0192761 A1 | 10/2003 | Chen et al. |

* cited by examiner

*Primary Examiner*—Dhiru R. Patel
(74) *Attorney, Agent, or Firm*—Parsons & Goltry; Michael W. Goltry; Robert A. Parsons

(57) ABSTRACT

An extendible and retractable electrical extension cord device is disclosed, which includes a housing adapted to be secured to a wall of a structure, and a reel mounted in the housing for rotation. An extension cord is wound about the reel, and has a first plug end in the housing and a second plug end extending outwardly through the housing and winding relative to the reel upon rotation thereof in a first direction, and unwinding relative to the reel upon rotation thereof in a second direction. An electric-powered drive assembly is mounted in the housing and is movable between an active condition rotating the reel in the first direction and an inactive condition permitting the reel to rotate freely in at least the second direction.

20 Claims, 8 Drawing Sheets

EXTENDIBLE AND RETRACTABLE EXTENSION CORD APPARATUS

CROSS REFERENCE TO RELATED APPLICATION

This application claims the priority of U.S. Provisional Patent Application No. 60/533,590, filed Dec. 31, 2003.

FIELD OF THE INVENTION

The present invention relates to extension cords and, more particularly, to extendible and retractable extension cord devices.

BACKGROUND OF THE INVENTION

Electrical extension cords are ubiquitous in modern society, and are highly useful for both indoor applications and outdoor applications. In particular, extension cords are useful in indoor applications for connecting vacuum cleaners, televisions, stereos and other electrical applies to remote electrical outlets, and in outdoor applications for connecting electric-powered drills, lawnmowers, blowers, grills, and other outdoor appliances to remote electrical outlets. Extension cords can be found in a variety of lengths.

Extension cords are unwieldy and difficult to store. If not stored properly, extension cords can become damaged, or entangled. In an effort to provide storage for extension cords, skilled artisans have devised various extension cord storage devices that provide an enclosed storage space for an extension cord. Most of the exemplary extension cord storage devices incorporate a reel onto which the extension cord is wound, in which the extension cord winds and unwinds relative to the reel between a stored wound condition about the reel and an operative extended position. Existing such extendible and retractable storage devices, while adequate, are difficult to construct, expensive, are not able to be used with extension cords of differing lengths, and are difficult to maintain and service. Other structural and functional shortcomings are also noted.

SUMMARY OF THE INVENTION

It is an object of the invention to provide a an extendible and retractable extension cord device which is low in cost, which is safe, which is easy to construct, which incorporates a reel and an electric-powered drive assembly for operating the reel, which can be used with extension cords having different lengths, and which includes unique features for allowing it to be used in outdoor applications, and that is easy to maintain and service.

According to the invention, there is provided an extendible and retractable electrical extension cord device including a housing adapted to be secured to a wall of a structure, a reel mounted in the housing for rotation, and an extension cord wound about the reel. The extension cord has a first plug end in the housing and a second plug end extending outwardly through the housing and winding relative to the reel upon rotation thereof in a first direction, and unwinding relative to the reel upon rotation thereof in a second direction. An electric-powered drive assembly is mounted in the housing and is movable between an active condition rotating the reel in the first direction and an inactive condition permitting the reel to rotate freely in at least the second direction. The electric-powered drive assembly includes a driven element coupled to the reel, and a drive element coupled to an electric motor and drivingly coupled to the driven element, in which the electric motor movable between the active condition (i.e., an ON position) driving the drive element and the inactive condition (i.e., an OFF position) idling the drive element. In one embodiment, the drive element is drivingly coupled to the driven element with first teeth carried by the drive element meshingly interacting with second teeth carried by the driven element. In another embodiment, an endless belt drivingly couples the drive element to the driven element. The first plug end of the extension cord is adapted to be coupled to an electrical outlet. A first switch is carried by the housing and is coupled to the electric-powered drive assembly, and which is operative for moving the electric-powered drive assembly between its active condition and its inactive condition. Preferably, the second plug end extends outwardly through a rollered opening of the housing. A vent through the housing opposes the reel, which cools the extension cord dissipating the heat it generates in the housing during its use. An electrical outlet is attached to, and located within, the housing, which is adapted to be wired to a source of electrical power and to receive the first plug end of the extension cord. A second switch is provided for turning the electrical outlet ON and OFF. The reel is held by a reel support removably affixed to the housing. The rollered opening is held by a removably attached cover of the housing. The cover has an outer face and an opposing inner face directed into the housing, and the rollered opening is inset relative to the outer face. A lid is mounted to the cover for movement between a first position away from the rollered opening and a second position enclosing the rollered opening.

According to the invention, an extendible and retractable electrical extension cord device is provided, which includes a receptacle secured to a wall of a structure, and a cover removably secured to the receptacle, in which the cover and the receptacle form an enclosed space. A rollered opening through the cover is also provided. An electrical outlet, which is disposed in the enclosed space, is mounted to the receptacle and wired to a source of electrical power. A reel, which is also disposed in the enclosed space, is mounted to a reel support removably affixed to the receptacle. An extension cord is wound about the reel, and has a first plug end adapted to be plugged into the electrical outlet and a second plug end extending outwardly through the rollered opening and winding relative to the reel upon rotation thereof in a first direction, and unwinding relative to the reel upon rotation thereof in a second direction. The cover has a vent that opposes the reel, which dissipates heat in the enclosed space generated by the extension cord when it is energized with electrical power. An electric-powered drive assembly is mounted in the housing and wired to the source of electrical power. A first switch is provided, which is operative for turning the electrical outlet ON and OFF, and a second switch is provided for turning the electric-powered drive assembly ON rotating the reel in the first direction and OFF permitting the reel to rotate freely in at least the second direction. The first switch is different from the second switch. The electric-powered drive assembly includes a driven element coupled to the reel, and a drive element coupled to an electric motor and drivingly coupled to the driven element, in which the electric motor movable between the active condition (i.e., an ON position) driving the drive element and the inactive condition (i.e., an OFF position) idling the drive element. In one embodiment, the drive element is drivingly coupled to the driven element with first teeth carried by the drive element meshingly interacting with second teeth carried by the driven element. In another embodiment, an endless belt drivingly couples the drive element to the driven element. The cover has an outer face and an opposing inner face directed into the enclosed space, and the rollered opening is inset relative to the outer face. A lid is mounted to the outer face of the cover for movement between a first position away from the rollered opening and a second position against the outer face enclosing the rollered opening. Another lid is also mounted to the outer face of the cover for movement between a first position away from the first and second switches and a second position against the outer face enclosing the first and second switches.

According to the invention, an extendible and retractable electrical extension cord device is provided, which includes a receptacle secured to a wall of a structure, and a cover removably secured to the receptacle, in which the cover and the receptacle form an enclosed space. The cover has an outer face, an opposing inner face directed into the enclosed space, and a cavity extending into the enclosed space and being inset relative to the outer face. A rollered opening is carried by and extends through the cavity into the enclosed space. An electrical outlet is disposed in the enclosed space and is mounted to the receptacle and wired to a source of electrical power. A reel is disposed in the enclosed space, and is mounted to a reel support removably affixed to the receptacle. An extension cord is wound about the reel, and has a first plug end adapted to be plugged into the electrical outlet and a second plug end extending outwardly through the rollered opening and winding relative to the reel upon rotation thereof in a first direction, and unwinding relative to the reel upon rotation thereof in a second direction. A vent through the cover opposes the reel, which dissipates heat generated by the extension cord in the enclosed space when it is energized with electrical power. An electric-powered drive assembly is mounted in the housing and wired to the source of electrical power. A first switch is operative for turning the electrical outlet ON and OFF, and a second switch is operative for turning the electric-powered drive assembly ON rotating the reel in the first direction and OFF permitting the reel to rotate freely in at least the second direction, in which first switch is different from the second switch. The electric-powered drive assembly includes a driven element coupled to the reel, and a drive element coupled to an electric motor and drivingly coupled to the driven element, in which the electric motor movable between the active condition (i.e., an ON position) driving the drive element and the inactive condition (i.e., an OFF position) idling the drive element. In one embodiment, the drive element is drivingly coupled to the driven element with first teeth carried by the drive element meshingly interacting with second teeth carried by the driven element. In another embodiment, an endless belt drivingly couples the drive element to the driven element.

Consistent with the foregoing summary of preferred embodiments of the invention, and the ensuing specification, which are to be taken together, the invention also contemplates associated embodiments.

BRIEF DESCRIPTION OF THE DRAWINGS

Referring to the drawings.

DETAILED DESCRIPTION OF PREFERRED EMBODIMENTS

Figures 1, 10:
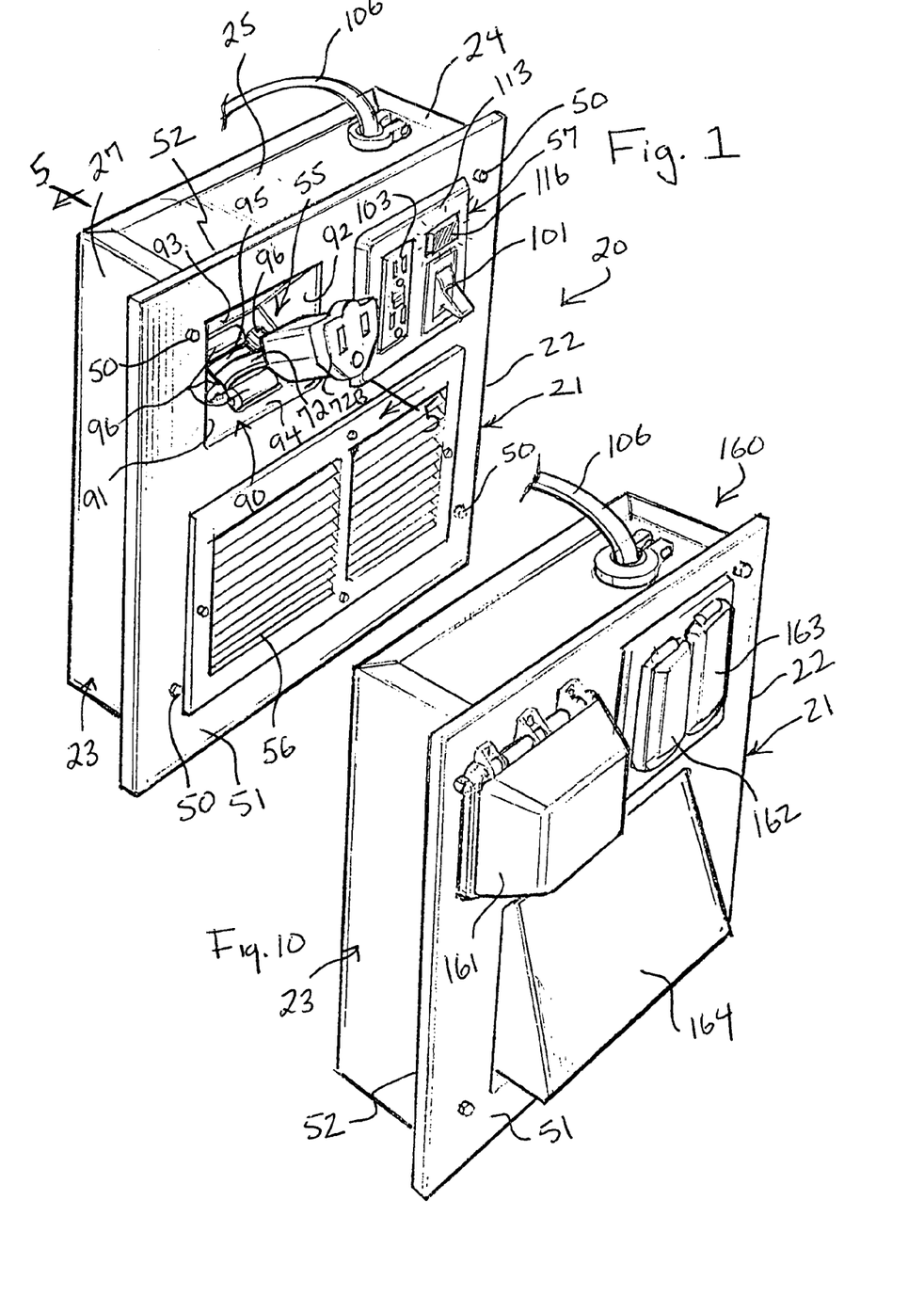
FIG. 1 is a perspective view of an extendible and retractable extension cord device constructed and arranged in accordance with the principle of the invention, the extendible and retractable extension cord device including a housing consisting of a cover removably attached to a receptacle.
FIG. 10 is a perspective view of another embodiment of an extendible and retractable extension cord device constructed and arranged in accordance with the principle of the invention.
Figure 3:
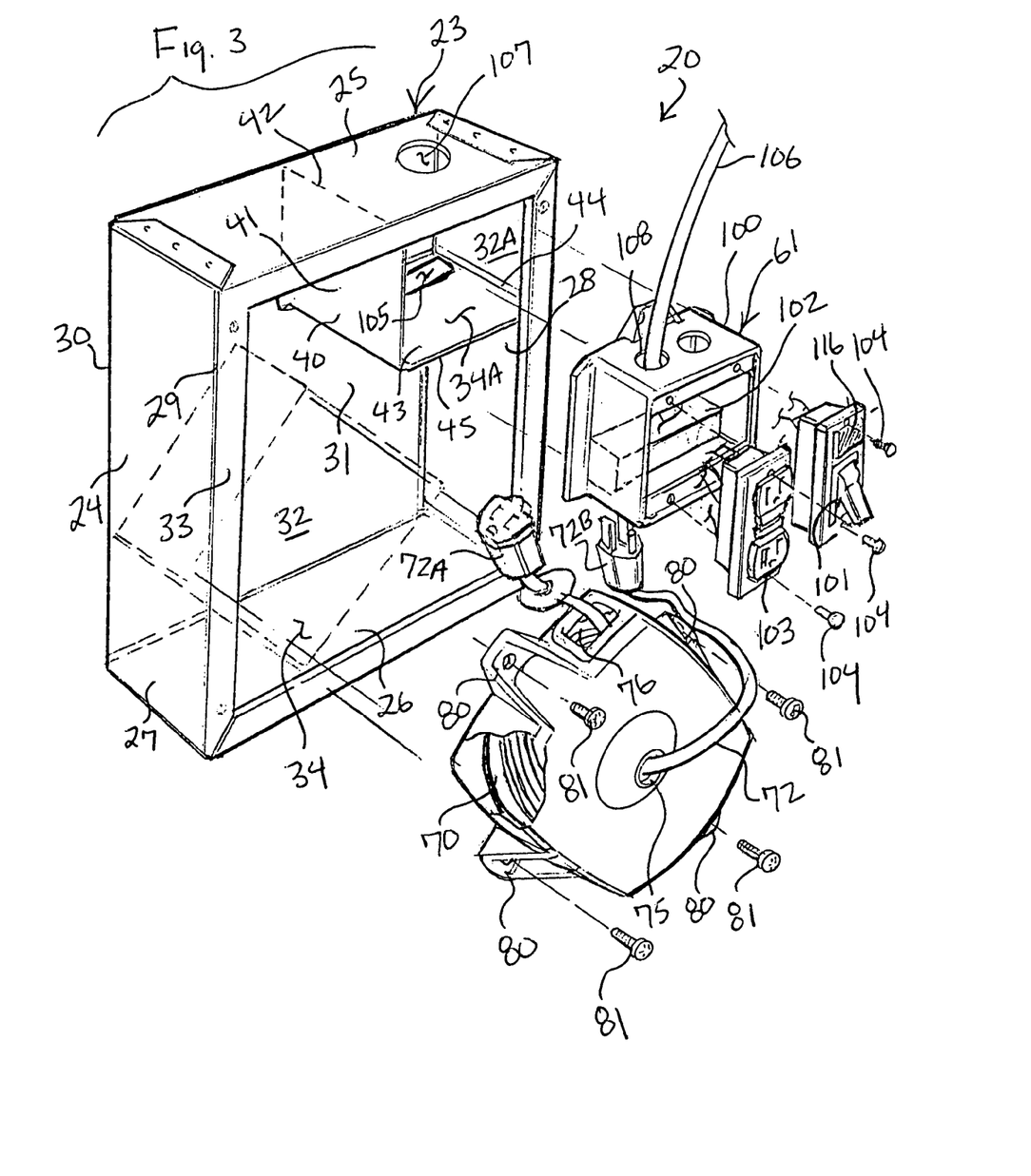
FIG. 3 is an exploded perspective view of the extendible and retractable extension cord device of FIG. 1 showing an extension cord held by a reel assembly, the receptacle, and a control/junction box assembly, in which portions of the reel assembly are broken away for illustrative purposes.

Turning now to the drawings, in which like reference characters indicate corresponding elements throughout the several views, attention is first directed to FIG. 1 in which there is seen an extendible and retractable extension cord device 20 constructed and arranged in accordance with the principle of the invention including a housing 21 consisting of a cover 22 removably attached to a receptacle 23. Referring to FIG. 3, receptacle 23 consists of a continuous sidewall 24 including opposing parallel top and bottom walls 25 and 26, and opposing parallel sidewalls 27 and 28, which together cooperate forming a continuous parametric front edge 29 and an opposing continuous parametric rear edge 30. Rear edge 30 is affixed to a back wall 31, in which the inner surfaces of back wall 31 and continuous sidewall 24 cooperate defining an interior space 32 of receptacle 23. Front edge 29 supports a continuous, inwardly directed parametric flange 33, which bounds an opening 34 into space 32.

The structure of receptacle 23 discussed thus far is fashioned of a single piece of sheet metal, which has been cut, folded, and secured with rivets, screws, and/or welding into its final form as shown in FIG. 3. It is to be understood that receptacle 23 can be integrally formed, or fashioned of a plurality of attached parts. Furthermore, although sheet metal is preferred, receptacle 23 can be fashioned of aluminum, plastic, or other substantially rigid material or combination of materials.

Attached to receptacle 23, such as by welding, a jointed attachment such as a tongue and groove joint or the like, is a partition 40, which is disposed in space 32. Partition 40 is a generally L-shaped element including an upright sidewall 41 having an edge 42 affixed to the inner surface of top wall 25, and a generally horizontal bottom wall 43 having an edge 44 affixed to the inner surface of sidewall 28. Walls 41 and 43 of partition 40 cooperate defining a front edge 45 directed toward opening 34, and an opposing rear edge 46 affixed to the inner surface of back wall 31. Sidewall 41 opposes and is parallel to an opposing upper portion of sidewall 28, and bottom wall 43 opposes and is parallel to an opposing end portion of top wall 25, defining a sub-space 32A of space 32 at the upper right quadrant of space 32 where top wall 25 and sidewall 28 meet. Front edge 44 and a portion of parametric flange 33 carried by top wall 25 and sidewall 28 cooperate forming a sub-opening 34A of opening 34, which leads into sub-space 32A.

Looking back to FIG. 1, cover 22 is a panel that, like receptacle 23, is fashioned largely of sheet metal, plastic, or other similar material or combination of materials. Cover 22 is attached to flange 33 (not shown in FIG. 1) with screws 50, and although four screws 50 are depicted in conjunction with the embodiment here designated 20, less or more can be used. Screws 50 provide a simple and inexpensive way of removably securing cover 22 to receptacle 23. It is to be understood that other devices well-known in the art and operative for providing the removable attachment of cover 22 to receptacle 23 can be used without departing from the invention, such as clips, hook-and-loop fasteners, etc. Receptacle 23 and cover 22 are each generally rectangular in shape. It will be understood that other shapes can be used, if desired.

Figure 5:
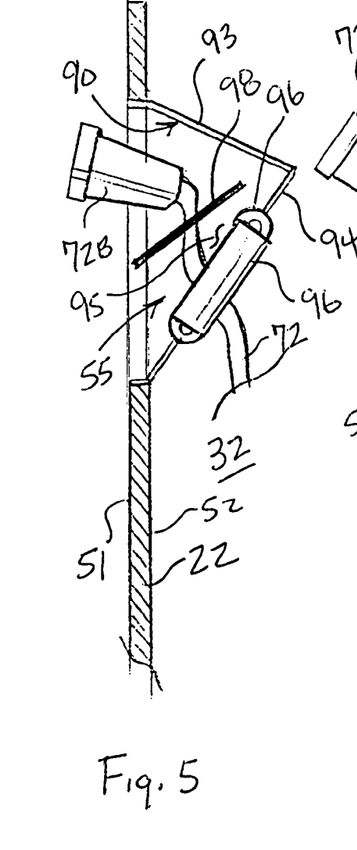
FIG. 5 is a vertical sectional view taken along line 5-5 of FIG. 1.

Referring momentarily to FIG. 5, cover 22 is generally flat and includes an outer face 51 and an opposing inner face 52. To secure cover 22 to receptacle 23, inner face 52 is directed against flange 33, and then cover 22 is fastened to flange 33 with screws 50, in which inner face 52 opposes and is parallel to back wall 31 and encloses opening 34 (including opening 34A) and space 32 (including space 32A). Cover 22 incorporates a rollered opening 55, a vent 56, and a control panel 57, further details of which will be discussed later in this specification.

Referring to FIG. 3, device 20 is equipped with a reel assembly 60, and a control/junction box assembly 61. Reel assembly 60 includes a reel 70, and a reel support 71. Reel support 71 is a housing, which contains reel 70. Reel 70 is mounted to reel support 71 for rotation in a conventional manner 70 well known in the art, further details of which will readily occur to the skilled artisan and will not be discussed. An extension cord 72 is wound about reel 70, and has opposing plug ends 72A and 72B. Plug end 72A is considered an inner plug end and plug end 72B is considered an outer plug end. Plug end 72A is a "male" plug and plug end 72B is a "female" plug and this can be reversed, if desired. Plug end 72B can be a single plug device or a multiple plug device. Plug end 72A extends outwardly from reel support 71 through a central opening 75 thereof, and plug end 72B extends outwardly from reel support 71 through another opening 76 thereof. To the extent so far discussed, reel assembly 60 is generally representative of existing and well known reel assemblies.

Figure 4:
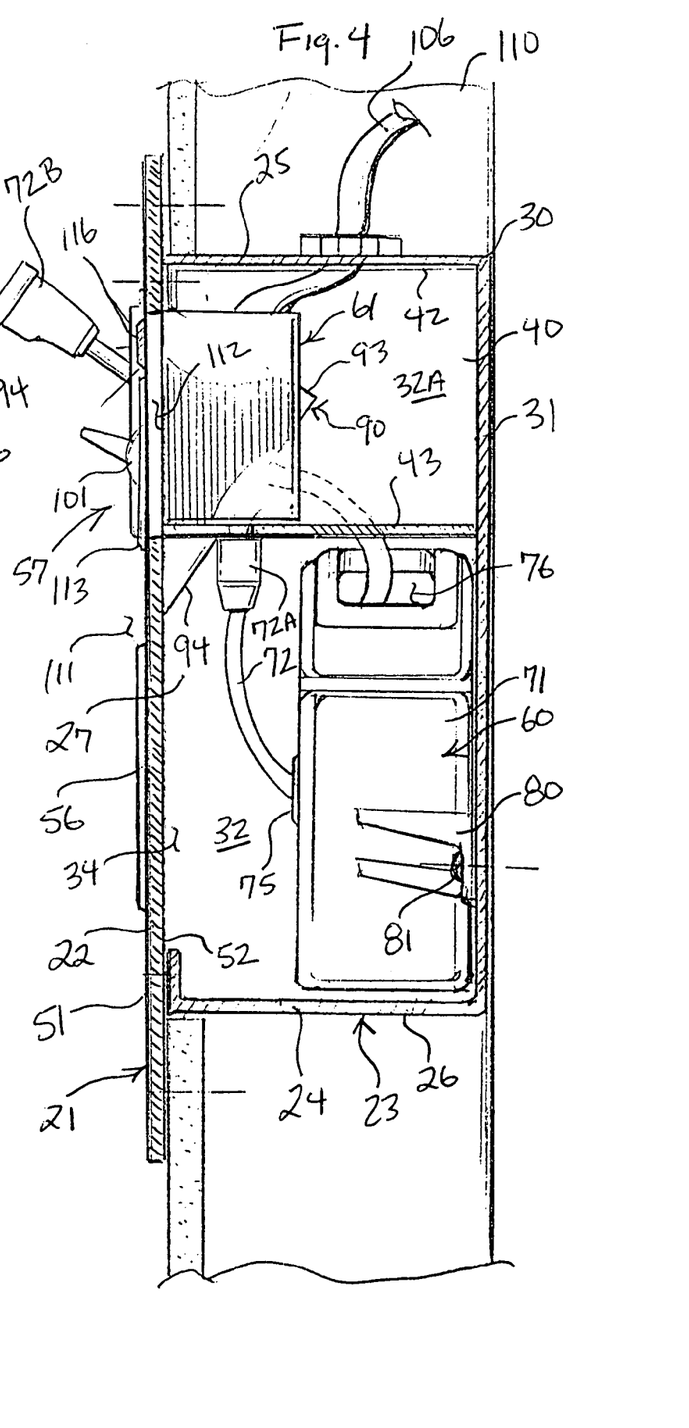
FIG. 4 is a vertical sectional view of the extendible and retractable extension cord device of FIG. 1 shown as it would appear mounted to a wall.

With additional reference to FIG. 4, reel assembly 60 is disposed in space 32, is located between bottom wall 43 of partition 40 and bottom wall 26 of receptacle 23, and is removably affixed to receptacle 23. Reel support 71 has a plurality of feet 80, which are positioned against the inner surface of back wall 31 and secured thereto with screws 81. Although four feet 80 and four corresponding screws 81 are employed, less or more of each can be used without departing from the invention. Furthermore, although reel support 71 is attached to back wall 31, at can be attached to receptacle at other locations in lieu of or in addition to back wall 31, including top wall 25, bottom wall 26, sidewall 27, sidewall 28, and/or flange 33.

The foregoing arrangement for removably attaching reel assembly 60 in place is simple and efficient way to removably couple reel assembly 60 to receptacle and allows it to be easily removed for maintenance or replacement. It is to be understood that reel assembly 60 can be removably attached to receptacle in other ways, such as with a hook and look assembly incorporating one or more elements thereof carried by reel assembly 60 and one or more complemental elements thereof carried by the inner surface of back wall 31. Reel 70 can be mounted for rotation to a mandrel, hub, or axle affixed receptacle 23, if desired. Other ways of removably attaching reel assembly 60 can be used. Because reel assembly 60 is mounted to receptacle and located in space 32, it is to be understood that reel 70 is considered mounted in and to housing 21 for rotation.

According to the invention, plug end 72A is disposed in space 32 as shown in FIG. 4, and plug end 72B extends outwardly through rollered opening 55 as seen in FIG. 1, extension cord winding relative to reel 70 (shown only in FIG. 3) upon rotation thereof in a first direction, and unwinding relative to reel 70 upon rotation thereof in a second, opposite direction. To unwind extension cord 72, plug end 72B is taken up, such as by hand, and simply pulled away from outer face 51 of cover 22, such that reel 70 is made to rotate and extension cord 72 unwinds relative to reel 70 and is extended to a desired length, in which plug end 72B plugged into the mating plug end of a selected appliance so as to provide electrical power thereto. Reel assembly 60 preferably incorporates a conventional and well known retracting mechanism (not shown), such that after unwinding extension cord 72 to a desired length extension cord may be acted upon with an abrupt, forcible pull so as to engage a retracting mechanism in reel support 71 acting on reel 71 causing it to forcibly rotate and wind up extension cord 72. Reel 70 can be rotated manually for winding up extension cord 72, if desired, such as with an attached handle or knob.

Referring to FIGS. 1, 4, and 5, cover 22 is fashioned with a cavity 90, which extends into space 32 (FIG. 4) being inset relative to outer face 51. Cavity 90 is formed by a wall structure of cover 22 including opposing spaced-apart sidewalls 91 and 92 (FIG. 1), a down-angled top wall 93, which meets and joins an up-angled bottom wall 94, both of which are referenced in FIGS. 1, 4, and 5. Rollered opening 55 is carried by up-angled bottom wall 94, and is characterized by an opening 95 (FIG. 1) bound by a perimeter edge fashioned with attached, rotating rollers 96. When extension cord 72 is moved between its retracted and extended positions in response to the winding and unwinding of extension cord 72 relative to reel 70, extension cord 72 interacts with rollers 96 providing smooth passage of extension cord 72 through opening 95 and reducing friction against extension cord 72 thus preventing extension cord 72 from becoming damaged over time due to repeated use and the repeated extending and retracting of extension cord 72. Rollered opening 55 is not only carried by up-angled bottom wall 94, it is also positioned relative to bottom wall 94 being inset relative to outer face 51 of cover 22 and angled downwardly toward reel assembly 60. As seen in FIG. 5, a collar 98 is provided on extension cord 72 adjacent plug 72B, which encircles extension cord 72 and which is located outside of rollered opening 55, in which collar 98 functions to prevent plug end 72B from falling into housing 21 through rollered opening 55. Collar 98 is an optional feature, and rollered opening 55 can be sized so that plug 72B is prevented from passing therethrough into housing 21.

Referring back to FIG. 3, control/junction box assembly 61 includes a junction box 100, to which an electrical switch 101 and electrical outlets 102 and 103 are mounted and secured, for instance, with screws 104, and yet they can be affixed to junction box 100 with rivets, adhesive, etc. Switch 101 and electrical outlets 102 and 103 are mounted to junction box 100 so as to be positioned substantially therein. Junction box 100, electrical switch 101, and electrical outlets 102 and 103 are conventional and well known. Switch 101 is a conventional toggle switch of the lever type commonly found and used for light switches and the like. Other toggle switch forms, including button type switch forms, can be used. Junction box 100 is fitted into sub-space 32A through sub-opening 34A, and is secured in place with one or more screws, rivets, etc. Outlet 103 and switch 101 are positioned adjacent sub-opening 34A that leads into sub-space 32A. An opening 105 is formed through bottom wall 43 of partition 40, and outlet 102 overlies opening 105 and is accessible therethrough.

Switch 101 and outlets 102 and 103 are hard wired to a source of electrical power via wiring 106 extending into receptacle 23 through an opening 107 through top wall 25, and then into junction box 100 through an opening 108 therethrough. According to the invention, switch 101 and outlets 102 and 103 are coupled in series, in which switch 101 is movable between a first or ON position energizing outlets 102 and 103 or otherwise turning them ON, and a second or OFF position de-energizing outlets 102 and 103 or otherwise turning them OFF.

Figures 2, 11:
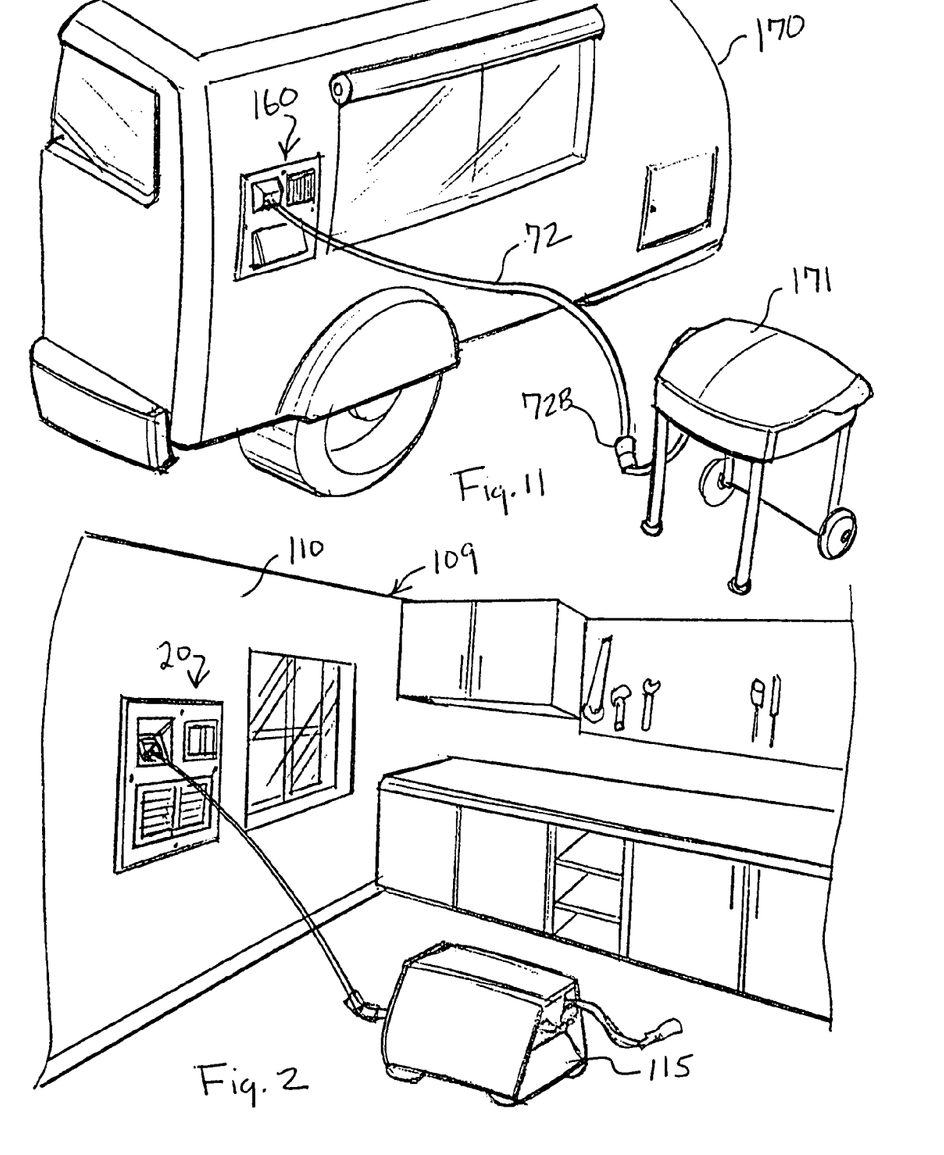
FIG. 2 is a perspective view of the an extendible and retractable extension cord device of FIG. 1 shown as it would appear mounted to a wall and in use.
FIG. 11 is a perspective view of the extendible and retractable extension cord device of FIG. 11 shown as it would appear mounted to a wall of a vehicle and in use.

As seen in FIG. 4, device 20 is mounted to a wall 110 of a structure, and wiring 106 is hard wired in a conventional manner to the electrical wiring of the structure. According to its intended use, wall 110 is an interior wall of a structure 109 as shown in FIG. 2, such as a home or business, or perhaps the interior wall of recreational vehicle, such as a motor home, or a trailer. Device 20 can be installed during the construction of wall 110, or after wall 110 is constructed. An opening 111 is formed through wall 110. Receptacle 23 is positioned within wall 110 in which back wall 31 projects into wall 110 and flange 33 is positioned to be substantially flush with the an outer surface 112 of wall 110 at opening 111. Receptacle 23 is secured in place, such as with screws, adhesive, etc., and wiring 106 is hard wired to the electrical wiring of the structure. Plug end 72A is plugged into outlet 102 at opening 105 through bottom wall 43, and cover 22 is then affixed to flange 33 enclosing space 32, and cover 22 being positioned against outer surface 112 of wall 110.

An opening 112 (FIG. 4) is provided through cover 22, which is located such that when cover 22 is secured in place to receptacle 23 encircles the faces of outlet 103 and switch 101. Looking to FIG. 1, a face plate 113 is secured with screws (not shown) to outer face 51 of cover 22, which encloses opening 112 (not shown in FIG. 1) and encircles the faces of outlet 103 and switch 101, in which the faces of outlet 103 and switch 101 are exposed at outer face 51 of cover 22, are available to be used, and this arrangement generally characterize control panel 57. Because face plate 113 is secured to cover 22, it is considered part of, or otherwise an extension of, cover 22.

As previously explained, switch 101 and outlets 102 and 103 are coupled in series, in which switch 101 is movable between a first or ON position energizing outlets 102 and 103 or otherwise turning them ON, and a second or OFF position de-energizing outlets 102 and 103 or otherwise turning them OFF. To use device, switch 101 is moved to its ON position, which energizes outlets 102 and 103. With plug end 72A of extension cord 72 plugged into outlet 102, turning switch 101 to its ON position energizes extension cord 72, which then may be extended and retracted as needed and used to provide electrical power to a selected appliance, such as a vacuum cleaner 115 in FIG. 2 or other electrical appliance. Electrical appliances may also be plugged into outlet 103 as desired in those instances in which extension cord 72 is not required. During periods of non-use, switch 101 can, of course, be moved into its OFF position de-energizing outlets 102 and 103, and thus also extension cord 72. Vent 56 opposes extension cord 72, and dissipates heat in the enclosed space generated naturally by extension cord 72 when it is energized with electrical power, and this cooling effect provided by vent 56 reduces the wear and tear on extension cord 72 caused by the heat it generates when it is used.

Referring to FIGS. 1 and 3, switch 101 incorporates a light 116, which illuminates only when switch 101 is ON. Accordingly, when light 116 is ON it functions to tell others that device 20 is activated, and when light 116 is OFF it functions to tell others that device 20 is deactivated. Furthermore, and as previously mentioned, switch 101 is a conventional toggle switch carried by device 20 and which is manually operable. If desired, switch 101 can be configured to be operable with a remote device, such as a remote control.

Reel assembly 60 is particularly useful and desired insofar as it is a conventional and readily-available item that requires no specialized training or specialized knowledge for facilitating its construction, should one desire to do so. Other forms of reel assemblies can be used with an extendible and retractable extension cord device constructed and arranged in accordance with the principle of the invention, if desired, and FIGS. 6-9 are instructive of two exemplary reel assemblies.

Figure 6:
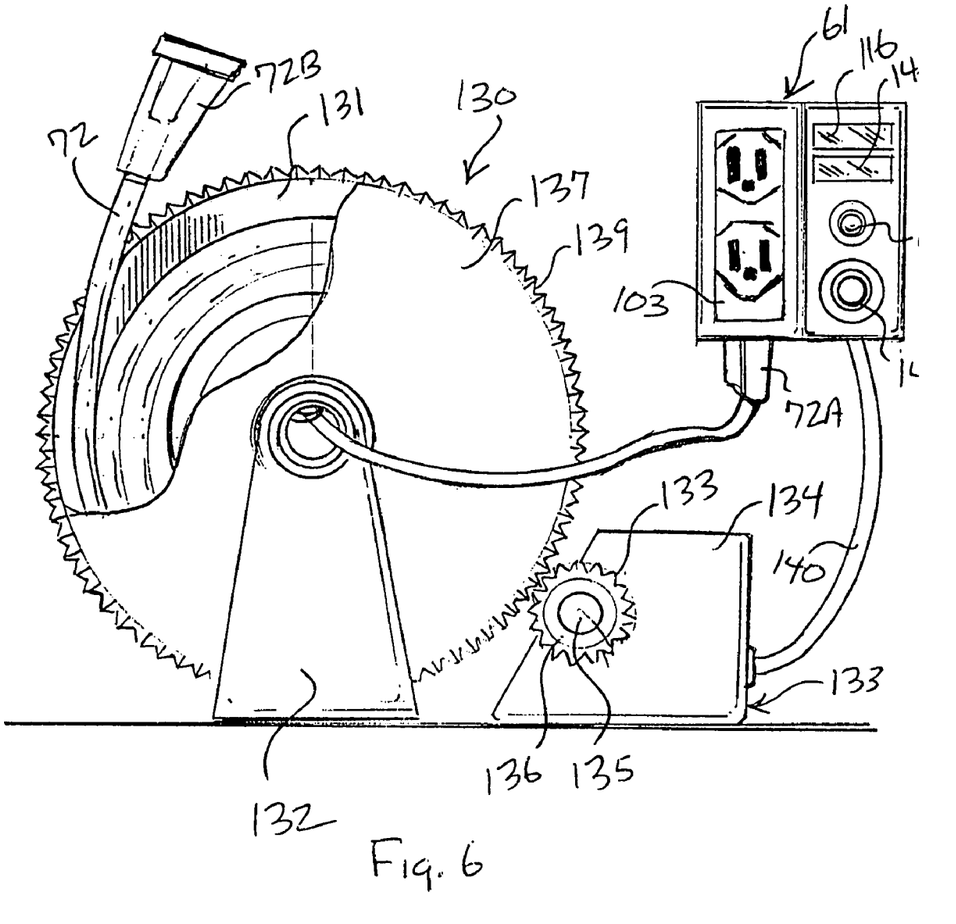
FIG. 6 is a side elevational view of an electric powered reel assembly for use with an extendible and retractable extension cord device constructed and arranged in accordance with the principle of the invention, with portions of a reel thereof being broken away for illustrative purposes.
Figure 7:
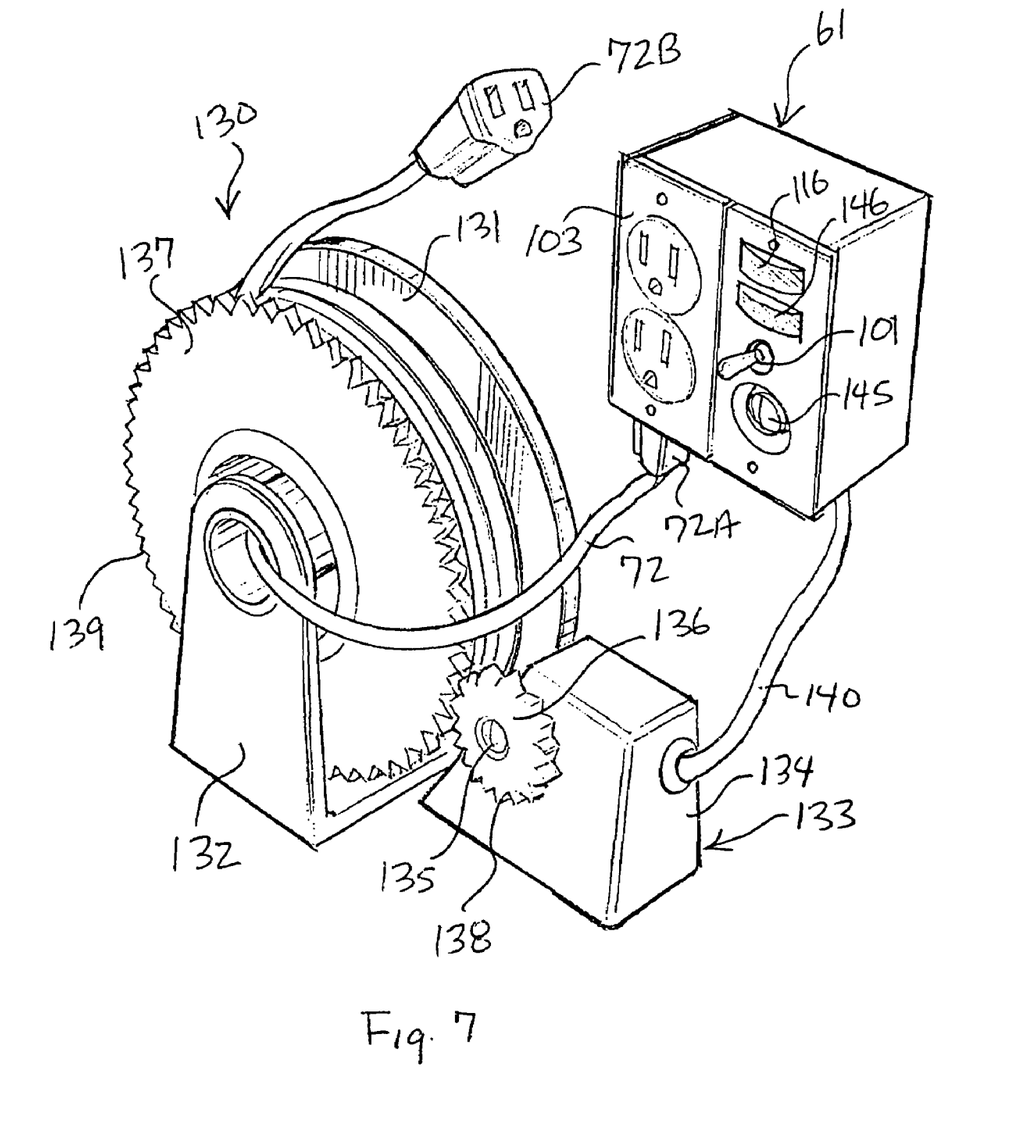
FIG. 7 is a perspective view of the electric powered reel assembly of FIG. 6.

Looking first to FIGS. 6 and 7, there is seen an electric-powered reel assembly 130, which is to be mounted within a housing of an extendible and retractable extension cord assembly constructed and arranged in accordance with the principle of the invention, and which includes a reel 131 mounted for rotation in a conventional manner to an upstanding reel support 132, which is to be secured in much the same was as reel assembly 60, namely, with screws, rivets, adhesive, etc. Extension cord 72 is wound about reel 131, and includes plug ends 72A and 72B, in which plug end 72A is shown plugged into control/junction box assembly 61. An electric-powered drive assembly 133 is also provided which is movable between an active condition rotating reel 131 in a first direction winding extension cord 72 and an inactive condition permitting reel 131 to rotate freely moreover, to rotate freely in at least the opposite direction allowing extension cord 72 to be unwound relative to reel 131.

Electric-powered drive assembly 133 includes an electric motor 134, and a drive element 136 drivingly coupled to a driven element 137. Electric motor 134 is mounted adjacent reel 131, and includes a drive shaft 135 to which drive element 136 is secured. Driven element 137 is carried by reel 131, and drive element 136 is coupled to driven element 137 with teeth 138 carried by drive element 136 that meshingly engage teeth 139 carried by driven element 137. In this embodiment, drive element 136 is a pinion to which teeth 138 are attached, and driven element is a wheel of reel 131 to which teeth 139 are attached, being exemplary of a rack-and-pinion gear assembly. Wiring 140 is provided, which electrically couples electric motor 134 to control/junction box assembly 61. Electric motor 134 is preferably hard-wired to control/junction box assembly 61, but it can be plugged into control/junction box assembly 61 if desired much in the way plug 72B is plugged into control/junction box assembly 61.

In the embodiment depicted in FIGS. 6 and 7, control/junction box assembly 61 incorporates switch 101 and light 116 as previously discussed in conjunction with the embodiment designated 20, in addition to a switch 145 and a light 146. Switches 145 and 101 are different from one another. It will be noted that switch 101 in FIGS. 6 and 7 has a different design from how it is depicted in connection with device 20. This is a change in shape and design only, but the operation of switch 101 in conjunction with the embodiment set forth in FIGS. 6 and 7 is the same as previously described. Like switch 101, switch 145 is a conventional toggle switch which is movable between an OFF position deactivating electric motor 134 and an ON position activating electric motor 134. More particularly, switch 145 is a conventional toggle switch of the push button type. Other toggle switch forms, including lever type switch forms, can be used. When electric motor 134 activates, it rotates drive shaft 135 which in turn rotates drive element 136, in which the engagement of drive element 136 to driven element 137 via teeth 138 and 139, respectively, functions to transfer the rotation of drive element 136 to driven element 137 thus rotating reel 131 causing extension cord 72 to wind relative to reel 131. When electric motor 134 is deactivated, drive shaft 135 is placed into idle state, which thus idles drive element 136 permitting it to rotate freely so that extension cord 72 can be taken up and unwound for use. After use of extension cord 72 is complete, switch 145 can be turned ON to activate motor 134 to automatically wind up extension cord 72. When extension cord 72 is completely or sufficiently wound up, switch 145 is to be turned OFF.

As with the discussion of light 116, light 146 illuminates only when switch 145 is ON. Accordingly, when light 146 is ON it functions to tell others that electric motor 134 is activated, and when light 146 is OFF it functions to tell others that electric motor 134 is deactivated. Furthermore, although switch 145 is a conventional toggle switch carried by device 20 and which is manually operable, switch 145 can be configured to be operable with a remote device, such as a remote control.

Figure 8:
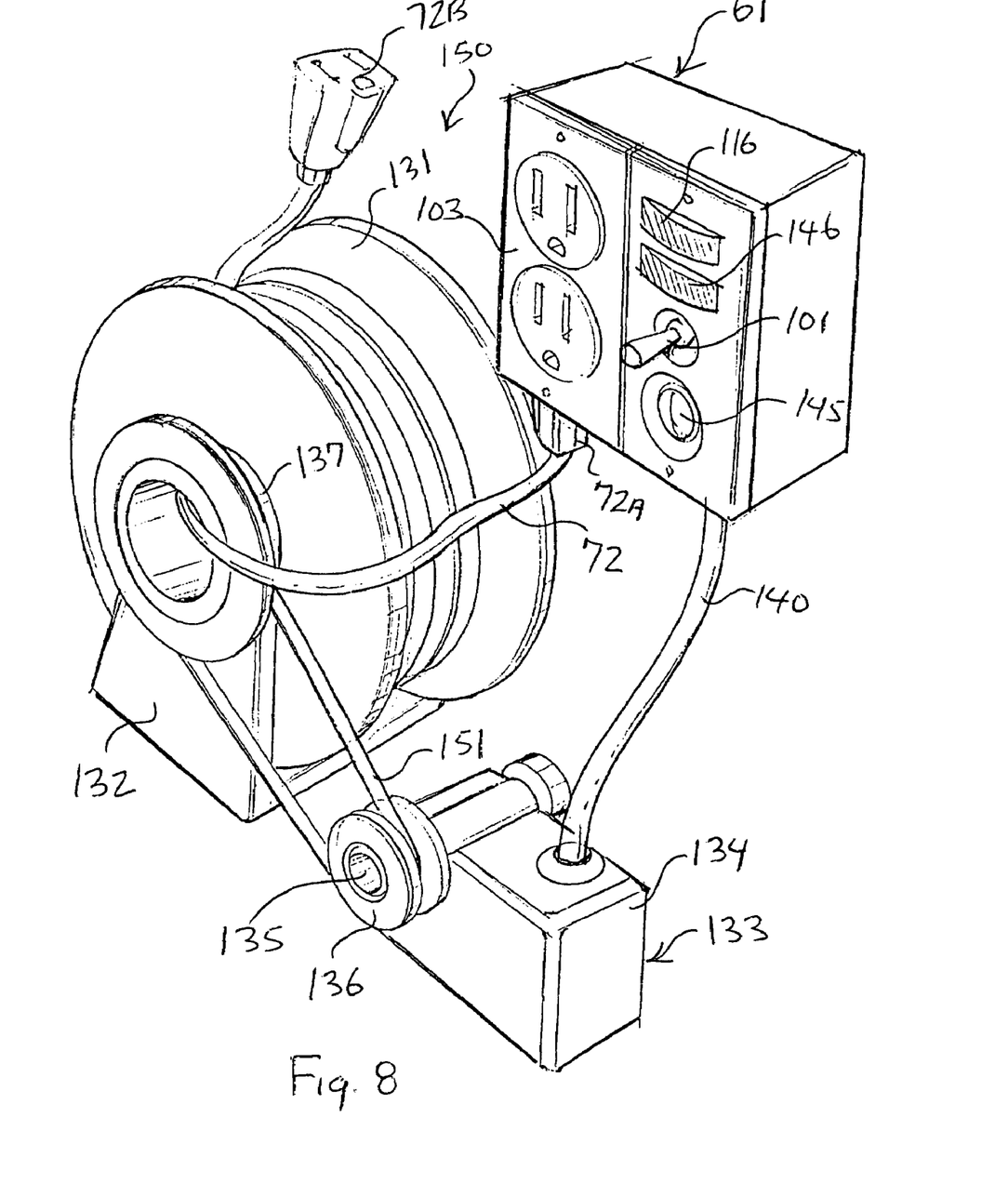
FIG. 8 is a perspective view of another embodiment of an electric powered reel assembly for use with an extendible and retractable extension cord device constructed and arranged in accordance with the principle of the invention.
Figure 9:
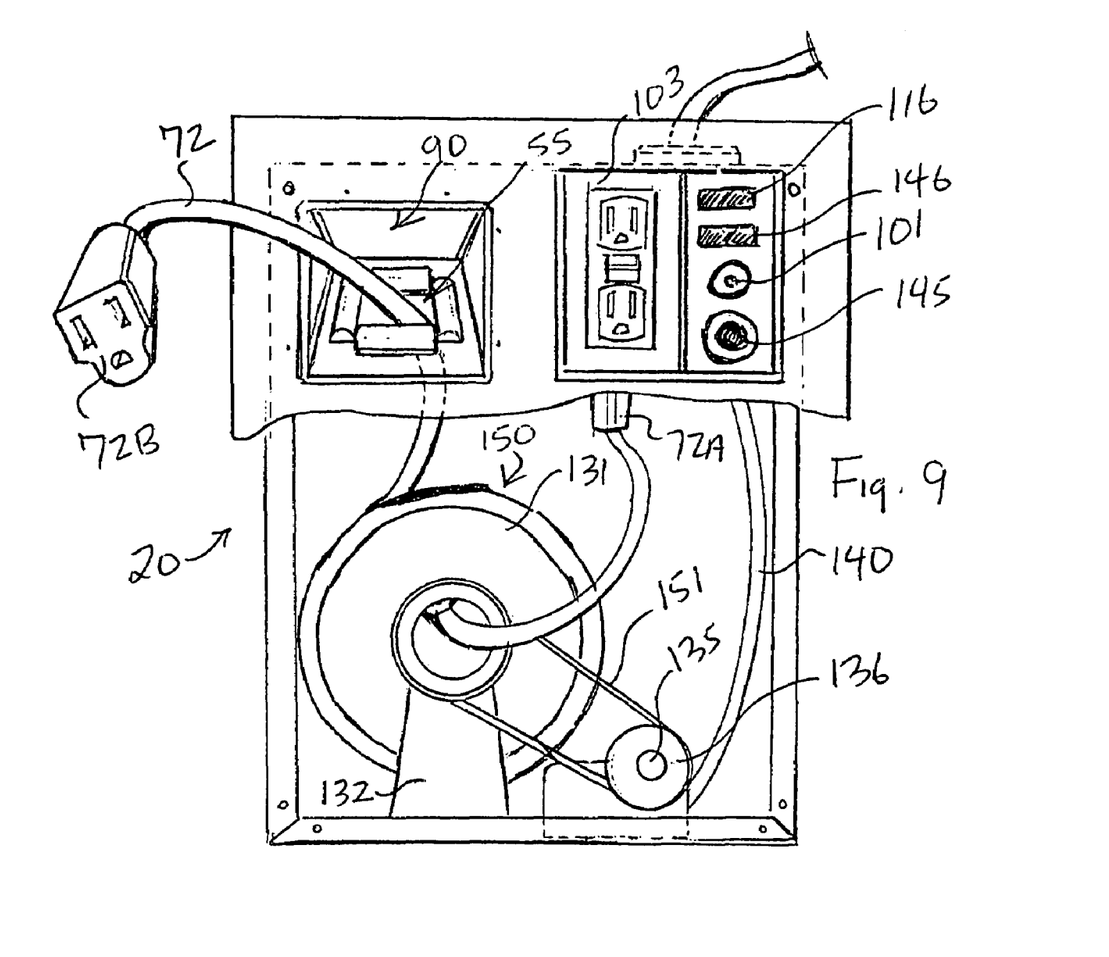
FIG. 9 is a side elevational view of an extendible and retractable extension cord device constructed and arranged in accordance with the principle of the invention, with portions thereof being broken away illustrating the electric powered reel assembly of FIG. 8 incorporated therewith.

According to the principles of the invention, attention is now directed to FIG. 8 illustrating another embodiment of an electric-powered reel assembly 160, which in common to the previously described electric-powered reel assembly 130 is to be mounted within a housing of an extendible and retractable extension cord assembly constructed and arranged in accordance with the principle of the invention, and which shares extension cord 72 would about reel 131, reel support 132, electric-powered drive assembly 133 including electric motor 134, drive shaft 135, drive element 136, and driven element 137. In this embodiment, drive element 136 is a pulley, driven element 137 is the central hub of the reel 131 that is mounted for rotation to reel support 132, and an endless belt 151 encircles the pulley and the central hub of the reel 131 drivingly coupling the pulley to the central hub, and transferring rotation of the pulley to the central hub for rotating reel 131 to wind extension cord 72 relative to reel 131, this arrangement being exemplary of a belt-driven pulley system. In all further respects, the previous discussion of electric-powered reel assembly 130 applies to electric-powered reel assembly 150, the only difference being the provision of endless belt 151 functioning to drivingly couple drive element 136 to driven element 137, as opposed to teeth 138 and 139 in conjunction with electric-powered reel assembly 130. FIG. 9 is a side elevational view of an embodiment of extendible and retractable extension cord device 20 shown as it would appear incorporating electric-powered reel assembly 150 set forth in FIG. 8, in which portions of cover 22 are broken away illustrating electric-powered reel assembly 150 disposed in housing 21. The embodiment set forth in FIG. 9 also incorporates lights 116 and 146, and switches 145 and 101, as illustrated and described in conjunction with FIG. 8.

The invention has been described above with reference to preferred embodiments. However, those skilled in the art will recognize that changes and modifications may be made to the embodiment without departing from the nature and scope of the invention. For instance, an extendible and retractable extension cord device can, if desired, by fashioned for outdoor applications, and can incorporate features for protecting it from the elements. An example of just such an extendible and retractable extension cord device is set forth in FIG. 10 and is designated generally at 160. Device 160 is identical to device 20 in all respects, and it will be understood that the foregoing discussion of device 20 applies to device 160, and that device 160 can incorporate reel assembly 60, electric-powered reel assembly 130, or electric-powered reel assembly 150. Unlike device 20, device 160 incorporates weather-resistant lids 161, 162, and 163, and a weather-resistant vent cover 164. Lids 161, 162, and 163 are conventional in nature, commonly found employed with outdoor electrical outlets and switches, and are pivotally attached to cover 22 in a conventional manner. Lids 162 and 163 are, more particularly, pivotally attached to face plate 113. Since face plate 113 is considered part of, or otherwise an extension of, cover 22, it is to be understood that lids 162 and 163 are considered pivotally mounted to cover 22.

Lid 161 is employed in conjunction with rollered opening 55 (not shown in FIG. 10), and is movable between an open position away from rollered opening 55 and outer face 51 of cover 22 allowing access to plug end 72B of extension cord 72 (not shown in FIG. 10) and a closed position against outer face 51 enclosing cavity 90 (not shown in FIG. 10) and rollered opening 55 so as to prevent moisture from passing into cavity 90 and also into housing 21 through rollered opening. Lid 162 is employed in conjunction with electrical outlet 103 (not shown in FIG. 10), and is movable between an open position away from electrical outlet 103 and outer face 51 of cover 22 allowing access to electrical outlet 103 and a closed position against outer face 51 enclosing electrical outlet 103 protecting it from moisture and other adverse environmental elements. Lid 163 is employed in conjunction with switch 101 (not shown in FIG. 10), and is movable between an open position away from switch 101 and outer face 51 of cover 22 allowing access to switch 101 and a closed position against outer face 51 enclosing switch 101 protecting it from moisture and other adverse environmental elements. In the event switches 145 and 101 are employed, it is to be understood that lid 163, when used, is sized and configured appropriately so as to be movable between its open position away from switches 145 and 101 and outer face 51 of cover 22 allowing access to switches 145 and 101 and a closed position against outer face 51 enclosing switches 145 and 101 protecting them from moisture and other adverse environmental elements.

Vent cover 164 is a shield, which overlies vent 56 (not shown in FIG. 10) shielding it from water. FIG. 11 shows device 160 employed in an outdoor application, namely, installed in an exterior wall of a recreational vehicle 170. In FIG. 11, extension cord 72 is shown as it would appear extended and coupled to an electric grill 171.

Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. An extendible and retractable electrical extension cord device, comprising:
    a housing adapted to be secured to a wall of a structure;
    a reel mounted in the housing for rotation;
    an extension cord wound about the reel, the extension cord having a first plug end in the housing and a second plug end extending outwardly through the housing and winding relative to the reel upon rotation thereof in a first direction, and unwinding relative to the reel upon rotation thereof in a second direction; and
    an electric-powered drive assembly mounted in the housing and movable between an active condition rotating the reel in the first direction and an inactive condition permitting the reel to rotate freely in at least the second direction.

2. The extendible and retractable electrical extension cord device according to claim 1, wherein the electric-powered drive assembly comprises:
    a driven element coupled to the reel;
    a drive element coupled to an electric motor and drivingly coupled to the driven element;
    the electric motor movable between the active condition driving the drive element and the inactive condition idling the drive element.

3. The extendible and retractable electrical extension cord device according to claim 2, wherein the drive element is drivingly coupled to the driven element with first teeth carried by the drive element meshingly interacting with second teeth carried by the driven element.

4. The extendible and retractable electrical extension cord device according to claim 2, further comprising an endless belt drivingly coupling the drive element to the driven element.

5. The extendible and retractable electrical extension cord device according to claim 1, wherein the first plug end of the extension cord is adapted to be coupled to an electrical outlet.

6. The extendible and retractable electrical extension cord device according to claim 1, further comprising a switch carried by the housing operative for moving the electric-powered drive assembly between its active condition and its inactive condition.

7. The extendible and retractable electrical extension cord device according to claim 1, wherein the second plug end extends outwardly through a rollered opening of the housing.

8. The extendible and retractable electrical extension cord device according to claim 7, wherein the rollered opening is held by a removably attached cover of the housing.

9. The extendible and retractable electrical extension cord device according to claim 8, wherein the cover has an outer face and an opposing inner face directed into the housing, and the rollered opening is inset relative to the outer face.

10. The extendible and retractable electrical extension cord device according to claim 9, further comprising a lid mounted to the cover for movement between a first position away from the rollered opening and a second position enclosing the rollered opening.

11. The extendible and retractable electrical extension cord device according to claim 1, further comprising a vent through the housing opposing the reel.

12. The extendible and retractable electrical extension cord device according to claim 1, further comprising an electrical outlet attached to the housing, which is adapted to be wired to a source of electrical power and to receive the first plug end of the extension cord.

13. The extendible and retractable electrical extension cord device according to claim 1, wherein the reel is held by a reel support removably affixed to the housing.

14. An extendible and retractable electrical extension cord device, comprising:
    a receptacle secured to a wall of a structure;
    a cover removably secured to the receptacle, the cover and the receptacle forming an enclosed space;
    a rollered opening through the cover;
    an electrical outlet, disposed in the enclosed space, mounted to the receptacle and wired to a source of electrical power;
    a reel, disposed in the enclosed space, mounted to a reel support removably affixed to the receptacle;
    an extension cord wound about the reel, the extension cord having a first plug end adapted to be plugged into the electrical outlet and a second plug end extending outwardly through the rollered opening and winding relative to the reel upon rotation thereof in a first direction, and unwinding relative to the reel upon rotation thereof in a second direction;
    a vent through the cover opposing the reel;
    an electric-powered drive assembly mounted in the housing and wired to the source of electrical power;
    a first switch operative for turning the electrical outlet ON and OFF; and
    a second switch for turning the electric-powered drive assembly ON rotating the reel in the first direction and OFF permitting the reel to rotate freely in at least the second direction;
    wherein the first switch is different from the second switch.

15. The extendible and retractable electrical extension cord device according to claim 14, wherein the electric-powered drive assembly comprises:
    a driven element coupled to the reel;
    a drive element coupled to an electric motor and drivingly coupled to the driven element;
    the electric motor movable between the active condition driving the drive element and the inactive condition idling the drive element.

16. The extendible and retractable electrical extension cord device according to claim 15, wherein the drive element is drivingly coupled to the driven element with first teeth carried by the drive element meshingly interacting with second teeth carried by the driven element.

17. The extendible and retractable electrical extension cord device according to claim 15, further comprising an endless belt drivingly coupling the drive element to the driven element.

18. The extendible and retractable electrical extension cord device according to claim 15, wherein the cover has an outer face and an opposing inner face directed into the enclosed space, and the rollered opening is inset relative to the outer face.

19. The extendible and retractable electrical extension cord device according to claim 18, further comprising:
- a first lid mounted to the outer face of the cover for movement between a first position away from the rollered opening and a second position against the outer face enclosing the rollered opening; and
- a second lid mounted to the outer face of the cover for movement between a first position away from the first and second switches and a second position against the outer face enclosing the first and second switches.

20. The extendible and retractable electrical extension cord device according to claim 1, further comprising:
- an electric-powered drive assembly mounted in the housing and wired to the source of electrical power;
- a first switch operative for turning the electrical outlet ON and OFF; and
- a second switch for turning the electric-powered drive assembly ON rotating the reel in the first direction and OFF permitting the reel to rotate freely in at least the second direction;
- wherein the first switch is different from the second switch.

* * * * *